(12) United States Patent
Rinn

(10) Patent No.: US 6,549,648 B1
(45) Date of Patent: Apr. 15, 2003

(54) METHOD FOR DETERMINING A POSITION OF A STRUCTURAL ELEMENT ON A SUBSTRATE

(75) Inventor: Klaus Rinn, Heuchelheim (DE)

(73) Assignee: Leica Microsystems Wetzlar GmbH, Wetzlar (DE)

(*) Notice: Subject to any disclaimer, the term of this patent is extended or adjusted under 35 U.S.C. 154(b) by 0 days.

(21) Appl. No.: 09/240,682

(22) Filed: Feb. 2, 1999

(30) Foreign Application Priority Data

Jun. 10, 1998 (DE) .......................................... 198 25 829

(51) Int. Cl.$^7$ ................................................ G06K 9/00
(52) U.S. Cl. ................. 382/151; 250/491.1; 250/559.3; 356/399; 356/501; 382/144; 702/127; 702/151; 716/19
(58) Field of Search ............................. 250/491.1, 548, 250/557, 559.3; 347/3; 355/52–53; 356/150, 399–401, 500, 503; 382/144–145, 151; 702/127, 150, 159; 716/19

(56) References Cited

U.S. PATENT DOCUMENTS

| | | | | |
|---|---|---|---|---|
| 4,547,895 A | * | 10/1985 | Mita et al. .................. | 382/144 |
| 4,781,463 A | | 11/1988 | Rosen et al. ................ | 356/394 |
| 4,830,497 A | * | 5/1989 | Iwata et al. ................. | 356/394 |
| 5,272,761 A | * | 12/1993 | Kanai et al. ................ | 382/147 |
| 5,379,108 A | | 1/1995 | Nose et al. .................. | 356/400 |
| 5,384,711 A | * | 1/1995 | Kanai et al. .................... | 716/5 |
| 5,596,283 A | * | 1/1997 | Mellitz et al. ............... | 325/754 |
| 5,715,063 A | * | 2/1998 | Ota ............................ | 356/400 |
| 5,737,441 A | * | 4/1998 | Nishi .......................... | 382/151 |
| 5,796,114 A | * | 8/1998 | Mizutani ..................... | 250/548 |
| 5,875,264 A | * | 2/1999 | Carlstrom .................... | 382/181 |
| 5,898,478 A | * | 4/1999 | Yim et al. .................... | 355/53 |
| 5,982,474 A | * | 11/1999 | Akiyama et al. .............. | 355/53 |
| 6,072,897 A | * | 6/2000 | Greenberg et al. ........... | 382/144 |
| 6,188,467 B1 | * | 2/2001 | Yamatsu et al. .............. | 355/72 |
| 6,278,957 B1 | * | 8/2001 | Yashuda et al. ............. | 702/150 |

FOREIGN PATENT DOCUMENTS

EP 0 176 910 4/1986

* cited by examiner

*Primary Examiner*—Bhavesh Mehta
*Assistant Examiner*—Gregory Desire
(74) *Attorney, Agent, or Firm*—Crowell & Moring LLP

(57) ABSTRACT

A method and apparatus determines the position P of a structural element that is non-orthogonal relative to the coordinate axes (x, y) of a substrate. The structural element is imaged on a detector array of a CCD camera that has a reference point. With the aid of a measuring window that is rotated at an angle $\theta$ to the substrate coordinate system, the position $P_{IPC}$ of one edge of the structural element is determined relative to the reference point. The position L of the reference point relative to the origin of the substrate coordinate system is determined from the angle $\Theta$ and the current measuring stage coordinates, so that for a particular position P, $P=P_{IPC}+L$, where $L=x \cdot \cos \theta \cdot y \cdot \sin \theta$.

11 Claims, 4 Drawing Sheets

METHOD FOR DETERMINING A POSITION OF A STRUCTURAL ELEMENT ON A SUBSTRATE

BACKGROUND AND SUMMARY OF THE INVENTION

This application claims the priority of German Application No. 198 25 829.1, filed Jun. 10, 1998, the disclosure of which is expressly incorporated by reference herein.

The invention relates to a method for determining the position of a structural element on a substrate, wherein the substrate is mounted on a measuring stage. The measuring stage is displaceable in an interferometrically measurable fashion in a measuring plane relative to a reference point. The structural element is imaged on a detector array by an imaging system that has its optical axis perpendicular to the measuring plane. The pixels of the detector array are arranged in rows and columns parallel to the axes of an X/Y coordinate system associated with the substrate. The position of the structural element is defined by the distance of one edge of the structural element relative to the reference point, and the position of the edge is determined on the detector array by evaluating an intensity profile of the edge image that is perpendicular to the edge direction and is derived from pixels located in a defined measuring window of the detector array.

A metrology system suitable for performing the method, such as Leica's commercially available LMS IPRO® measurement system is described, for example, in the text of the paper "Pattern Placement Metrology for Mask Making," by Dr. Carola Bläsing, delivered in the Education Program of Semicon Genf on Mar. 31, 1998, the disclosure of which is expressly incorporated by reference herein.

The structural elements (structures) to be measured consist in particular of opaque or transparent areas (such as patterns) on mask surfaces or structures on wafers or reticles used in semiconductor manufacturing. The positions of the edges of the structural elements are measured in a coordinate system defined on the mask (mask coordinate system). The mask is mounted in the measuring machine on a measuring stage (such as an X/Y stage) that is displaceable in a measuring plane. The measuring stage is displaceable relative to a reference point in an interferometrically measurable fashion, with the position of the mask coordinate system being aligned using alignment marks relative to a machine coordinate system of the measuring machine. Usually, the contact point of the optical axis of the imaging system on the mask is used as the reference point.

A structural range to be measured, following a suitable displacement of the measuring stage, is imaged (enlarged by the imaging system) on a detector array of a CCD camera. The pixels of the CCD camera are arranged in rows and columns parallel to the aligned axes of the mask coordinate system. Conventionally, the edges of the structural elements to be measured are likewise parallel or perpendicular to the axes of the mask coordinate system and hence also to the rows and columns of the detector array. The edge position that results from the evaluation of the image of the structural element taken by the detector array is provided by the interpolated pixel rows or pixel columns on which the edge lies relative to the reference point. The detector array is generally aligned such that the center of its camera screen image lies on the optical axis of the imaging system, so that this center (screen origin) is used as the reference point.

The image of the structural element is evaluated using image analysis process methods. A specific array range is selected for the measurement with the aid of a rectangular measurement window (sometimes referred to as a measurement field) defined and generated by software. The measurement window is placed on a portion of the image of the structural element to be measured. As a result of the resolution and imaging quality of the imaging system, the degree of contrast of the edge image varies. The best contrast is set with the aid of a TV autofocusing system. An average value is formed from the intensities of the pixels that lie in a row or column parallel to the edge of the structural element within a measuring window. Perpendicular to the edge, this produces an intensity profile of the edge image over one pixel row or pixel column. The position of the edge is defined by the 50% level value of this intensity profile.

The structural elements to be measured have different widths and lengths. In order to specify the position of a structural element on the mask (such as the pattern placement), the edge lengths that are parallel to one another are frequently measured and the center line (or midpoint) between the two edges is given as the position. In a structural element that can be measured by the width and length within the measuring window formed by the detector array or in two intersecting structural elements detected using two measuring windows, the position of the structure is defined by the coordinates of the intersection of the two center lines through the windows.

To an increasing degree, structural elements used in designing semiconductor circuits no longer extend parallel or perpendicular to the mask coordinate system. The image that results from the detector array representing these non-orthogonal structural elements is therefore likewise no longer parallel to or perpendicular to the pixel rows and pixel columns of the detector array.

There is therefore needed a system and method for measuring structural elements having angles other than parallel or perpendicular to the coordinate system (so-called "non-orthogonal" elements).

By rotating the CCD camera or the measuring stage, these structural elements can again be aligned orthogonally to the pixel rows and columns of the detector array. The rotational angle can be measured and hence the position of the edge or the position of the structural element can be calculated back to the non-rotated coordinate system so that the measuring machine for orthogonal and non-orthogonal structural elements can perform measurements directly using the same evaluation method and can output the measurement results in a comparable form.

One disadvantage of this method is the high mechanical cost required for precise mounting when rotating the CCD camera or the measuring stage. In addition, the rotation itself and the alignment with the edge requires additional time expenditures which lengthens the time required for measurements. With the ever increasing structural density and number of structural elements to be checked by measurement, however, limiting the amount of processing time has steadily grown in importance.

Hence, the goal of the invention is to provide a method and measuring machine that can be used on structural elements aligned in any direction while not requiring mechanical changes in the measurement process within a measuring field.

This goal is achieved according to the present invention by providing a method in which a rectangular measuring window is produced and aligned with a boundary line parallel to the edge direction, the direction of the boundary line of the measuring window that is perpendicular to the edge direction is determined in the coordinate system of the detector array by its rotational angle θ, and in the case of the boundary lines of the measuring window that are not orthogonal to the rows or columns of the detector array, a virtual array is formed whose fields lie in rows and columns parallel to the boundary lines of the measuring window. Intensity values are assigned to the fields that are determined by a weighted evaluation of the intensities of the pixels in the detector array, each of the pixels being covered by a field. The position $P_{IPC}$ of the edge is determined from its distance to the reference point, using the intensity values associated with the fields, and the position P of the edge in the coordinate system of the substrate is given as a function of the rotational angle θ, the position $P_{IPC}$, and the x,y position of the reference point in the coordinate system of the substrate by the equation: $P=P_{IPC}+L$, wherein $L=x\cdot\cos\theta+y\cdot\sin\theta$.

For automatic alignment of the boundary line of the measuring window parallel to the edge direction, the measuring window can be internally divided perpendicularly to the edge direction. Measuring information is determined in each measuring window that defines the edge position. The measuring window is turned until an optimum correlation of the measuring information is achieved. The size of the virtual fields is advantageously adjusted to that of the pixels. The adaptation is advantageously performed as a function of the rotational angle θ.

The method according to the invention is based on the same measuring information which the known measuring machine produces. The basic measuring principle of deriving the edge position within a rectangular measuring window from the pixel intensities is retained. The method therefore has the advantage of being able to be retrofitted to existing machines, such as the current LMS IPRO® System.

The rotational angle of the measuring window, generated by software, in the predetermined coordinate system of the measuring window can be calculated with a high degree of accuracy and is used as an additional parameter in producing measured values. This parameter is also implicitly contained in the known method for orthogonal structural elements and in that case has a fixed value of 90° with the x coordinate and a value of 0° with the y coordinate. This facilitates linking the method for determining positions of non-orthogonal structural elements according to the invention with the method used previously.

A critical step is the transfer of the measured intensity values of the real (actual) pixels which are overlapped by the selected, rotated, measuring window into a virtual pixel array that is orthogonal to the boundaries of the rotated measuring window. The intensity values associated with the virtual pixels (fields) are obtained by performing a weighted evaluation of the real pixels which are overlapped. Within the coordinate system of the measuring window, the position of the edge of the structural element can again be determined by the known image analysis method. In a mathematical interpretation, the edge found is a straight line in the rotated coordinate system of the measurement window, so that the distance of the edge from a reference point in the measuring window of the real detector array can be determined from the rotational angle of the measuring window by using coordinate transformation. The optical axis of the measuring system is selected as the reference point which passes through the center of the measuring field formed by the detector array.

The position of the structural element in the mask coordinate system is obtained, with the distance of the reference point from the origin of the mask coordinate system being determined at the same time. This distance clearly depends on the current measuring stage coordinates and the rotational angle of the measuring window. The position of the edge is thus defined by the distance of a straight line from the origin of the mask coordinate system to the edge and the angle at which this straight line intersects an axis of the mask coordinate system.

The positions of two structural elements that intersect at any angle can therefore be defined and determined by the intersection of the straight lines associated with them. The same also applies to the position of a structural element that is aligned in any direction and whose width and length can be measured.

Other objects, advantages and novel features of the present invention will become apparent from the following detailed description of the invention when considered in conjunction with the accompanying drawings.

DETAILED DESCRIPTION OF THE DRAWINGS

Figure 1A:
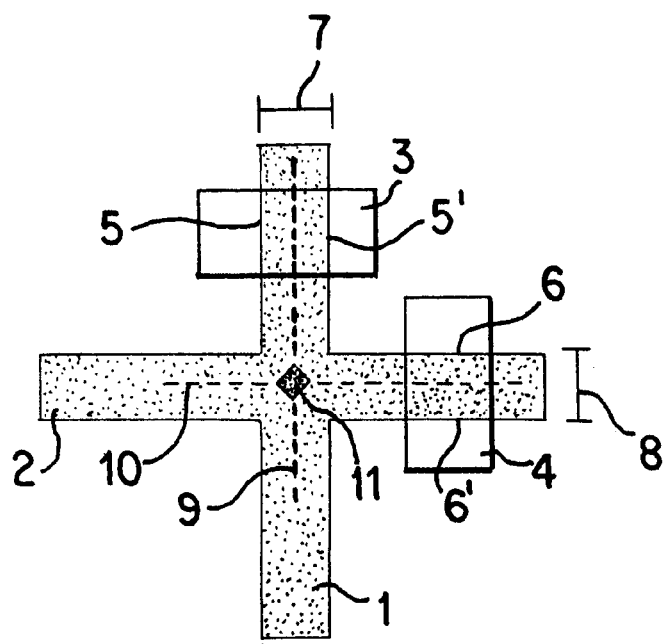
FIGS. 1A and 1B show an example of an orthogonal and a non-orthogonal structural pattern, respectively.

FIG. 1A illustrates a first structural pattern which may be found on a substrate such as a mask, wafer, reticle or the like, and imaged via a CCD camera for example. The pattern consists of two structural elements 1, 2 perpendicular to one another. A measuring window (also called a measuring field) 3, 4 is superimposed on each of the structural elements, in which the edges 5, 5' and 6, 6' of the structural elements 1, 2 respectively are determined. The size of the measuring window is defined by the imaging system software. From the difference between the edges 5–5' and 6–6', the widths 7, 8 of the structural elements 1, 2 are determined. The center lines 9, 10 (or midpoint) of the structural elements 1, 2 are usually employed to define the position of the structural elements. The intersection 11 of the center lines 9, 10 is used to define the position of the structural pattern.

Figure 1B:
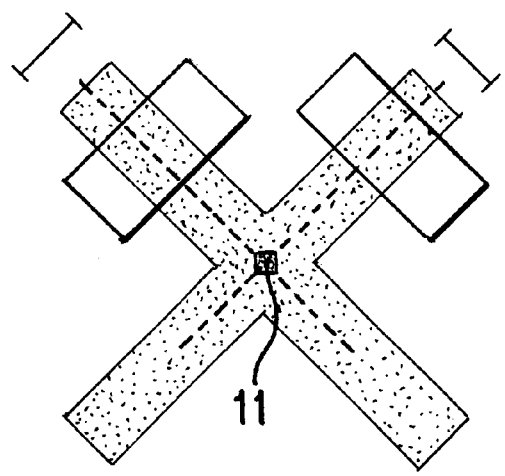

The second structural pattern shown in FIG. 1B is rotated relative to the structural pattern in FIGS. 1A around intersection 11. When both structural patterns (FIGS. 1A and 1B) are shown in the same orthogonal system of coordinates, the structural pattern of FIG. 1B is referred to as a "non-orthogonal" pattern.

Figure 2:
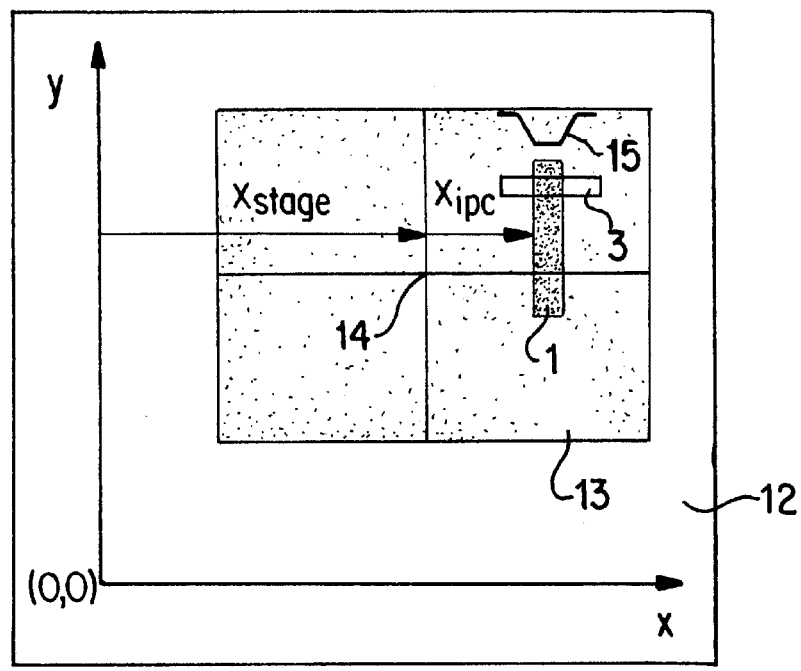
FIG. 2 illustrates the determination of the position of an orthogonal structural element.

The conventional measurement method for determining the position of an orthogonal structural element 1 will be described with reference to FIG. 2, said element 1 being applied as an opaque element to a mask 12 for example. The mask 12 rests on a measuring stage, such as a movable X/Y stage which is not shown. The mask coordinate system x, y is aligned with the measuring stage coordinate system. The current field of view is represented by detector array 13 of a CCD camera for example. The center of the detector array 13 serves as a reference point 14 within the measuring window. The center 14 lies on the optical axis of the imaging system, likewise not shown. The individual pixels of the detector array 13, which cannot be seen here, are arranged in rows and columns parallel to the mask coordinate system.

An intensity profile 15 determined in the measuring window 3 has a schematically trapezoidal pattern. The 50% value of the flanks of the intensity profile 15 are used to define the edge positions of the structural element 1. The left edge has a horizontal distance $X_{IPC}$ ($_{IPC}$=image processing coordinate), from reference point 14. The horizontal distance of reference point 14 with respect to the y axis of the mask coordinate system is termed $X_{stage}$ ($_{stage}$=measuring stage). In a similar fashion, the coordinates of the upper and lower edges of the structural element 1 can be determined. The position of an edge is therefore generally given by the following:

$$P_X = X_{IPC} + X_{stage}; \text{ and}$$

$$P_Y = Y_{IPC} + Y_{stage}$$

With orthogonal structural elements, these positions $P_x$, $P_y$ are therefore vectors perpendicular to the x or y axes of the mask coordinate system, whose lengths are therefore equal to the distance of the edge from the corresponding coordinate axis.

Figure 3:
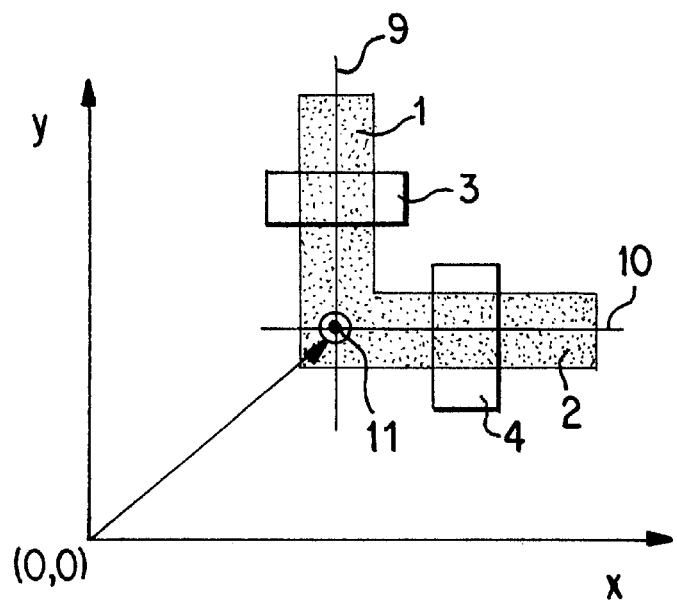
FIG. 3 illustrates the determination of the position of a structural pattern.

FIG. 3 shows how the position of an orthogonal structural pattern 1, 2 is determined from these measurements. As noted above, the position of the structural pattern is defined by the coordinates of the intersection point 11 of the center lines 9, 10 through the structural elements 1, 2 in the measuring windows. In other words, it is defined by a vector that runs from the origin (0, 0) of the mask coordinate system to the intersection point 11. This vector is composed of the two above-mentioned vector components $P_X$, $P_Y$ which are perpendicular to one another.

Figure 4A:
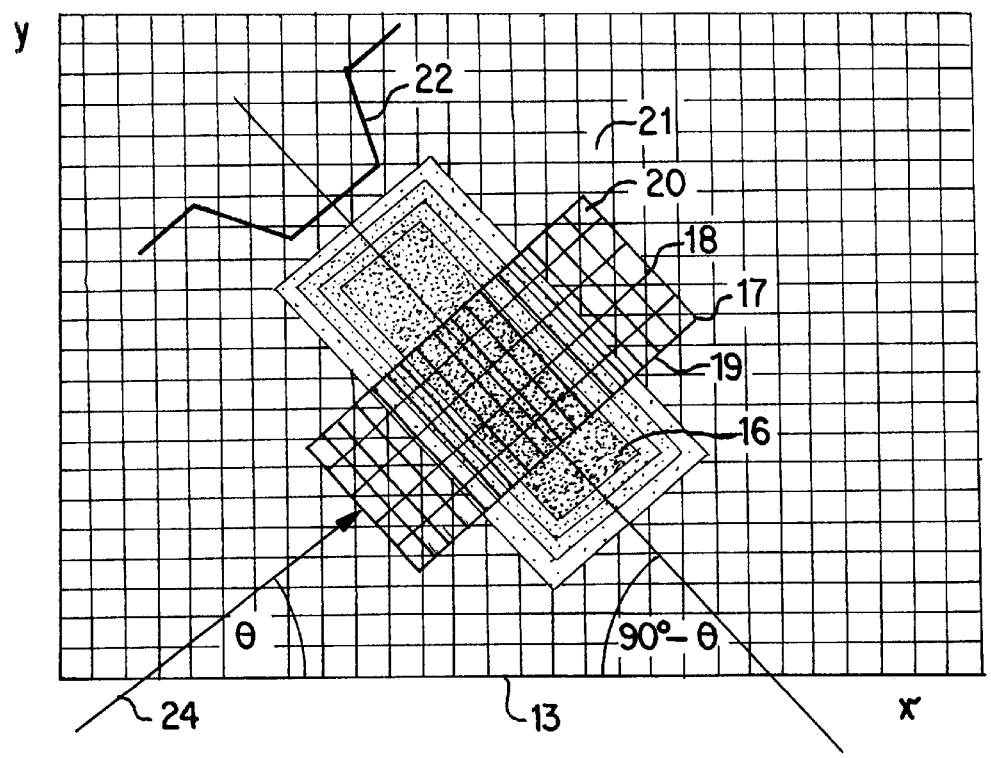
FIG. 4 illustrates edge measurement on a non-orthogonal structural element according to the invention.
Figure 4B:
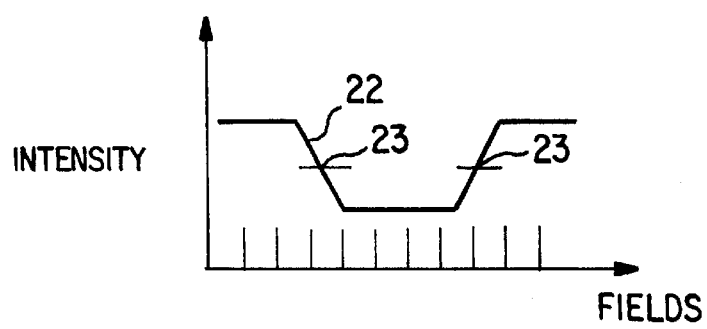

FIG. 4 shows a non-orthogonal structural element 16 whose lengthwise direction is inclined at an angle of (90-θ) to the x direction of the detector array 13, shown partially. The measuring window 17 which is laid crosswise over the structural element 16 for measuring the position of the elongated edge of the structural element 16 is aligned with its short boundary line 18 parallel to the path of the elongated edge. This alignment can be performed individually by the operator of the measuring machine. However, it can also be performed automatically by the job definition for the measuring machine. The subject of automatic optimization of alignment will be discussed further below. The longer boundary line 19 of the measuring window 17 in this view then forms an angle Θ with the x direction of the detector array 13.

Rows and columns of fields 20 are formed within the measuring window 17. The rows and columns run parallel to the boundary lines 18, 19 of the measuring window 17. Fields 20 each partially overlap several of the actual pixels 21 of the detector array 13, as can be seen in the area outside the structural element 16. For clarity purposes, the pixels 21 covered by the structural element 16 are not shown. The amount of each actual pixel covered by a particular field 20 can be determined and used to weight the measured intensity values of the respective pixels 21 within the field 20. The total of the weighted intensity values is thus assigned to the respective field 20.

The fields 20 generally do not have the same size as the actual pixels 21 in the CCD detector array. Advantageously, for example, the width of the measuring window 17 in the direction of boundary line 18, i.e. parallel to the edge to be measured, is matched to the size of angle Θ. As a result, the number of pixels 21 covered by the measuring window 17 can be reduced and the intensity components to be taken into account can be determined more precisely. An intensity profile 22 is formed from the averages of the fields 20 that lie in a column parallel to the edge being detected. The profile is shown both above the measuring window 17 and in a separate graph. The 50% values 23 of the flanks of the intensity profile 22 determine the position of the edges relative to boundary line 18 of the measuring window 17.

For automatic optimization of the alignment of boundary line 18 of the measuring window 17 parallel to the edge direction of the structural element 16, the measuring window 17 can be divided into two partial windows, perpendicularly to the edge direction. In each of the partial windows, measuring information is obtained defining the edge position. This can be done using the curve of the intensity profile or the determined edge position, for example. The measuring window 17 is then rotated until an optimum correlation of the measuring information of each partial window is achieved, for example until equal edge positions are obtained in the two partial windows with a minimum difference, thus indicating that the boundary line 18 of the measuring window is optimally aligned in parallel to the edge of the structural element.

The vector 24 that points to the measuring window 17 originates on a straight line running parallel to the edge direction determined, said straight line extending through the reference point 14 (not shown) on the detector array 13. The length of the vector 24 is therefore the perpendicular distance from the boundary line 18 of the measuring window 17 to this straight line. If the position of the edge of the structural element 16 within the measuring window 17 is known, the distance of the edge from the reference point can then be determined.

Figure 5:
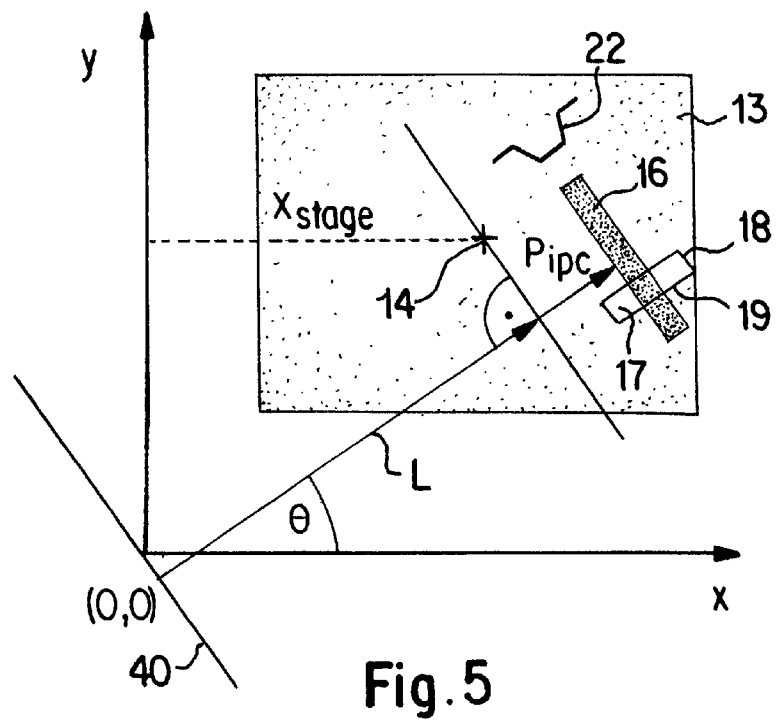
FIG. 5 illustrates the determination of the position of a non-orthogonal structural element according to the invention.

In FIG. 5, the critical parameters needed for determining the position of the non-orthogonal structural element 16 are shown in the mask coordinate system x, y. The measured edge of the structural element 16 has a perpendicular distance $P_{IPC}$ from the reference point 14 of the detector array 13. The vector L that represents the perpendicular distance of the reference point 14 from a straight line 40 that runs through the origin (0, 0) of the mask coordinate system and parallel to the edge direction is inclined at an angle Θ to the x axis. The position P of the edge of the non-orthogonal structural element 16 is then calculated by:

$$P = P_{IPC} + L, \text{ where } L = x \cdot \cos\theta + y \cdot \sin\theta$$

When θ=0°, the structural element is orthogonal to the x axis (see structural element 1 of FIG. 3) and with θ=90°, the structural element is parallel to the x axis (see structural element 2 of FIG. 3). The illustration is therefore compatible to the representations of the position P of an edge already used for orthogonal structural elements.

Figure 6:
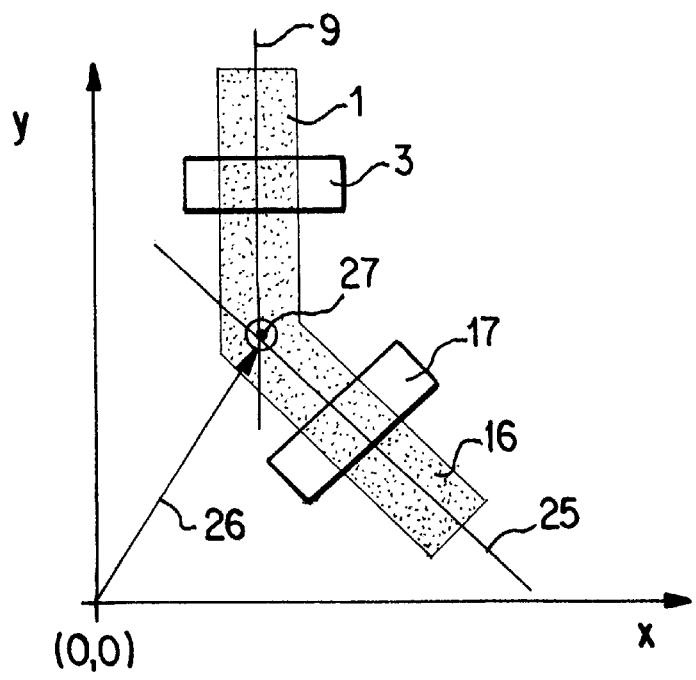
FIG. 6 illustrates the determination of the position of a structural pattern aligned in any direction according to the present invention.

FIG. 6 shows the critical parameters for specifying the position of a structural pattern that is composed of an orthogonal structure element 1 and a non-orthogonal structural element 16. From the positions of the two edges of each of the structural elements 1, 16 the center lines 9, 25 can be determined once again. Vector 26 from the mask coordinate origin (0, 0) to the intersection point 27 of the center lines gives the position of the structural pattern in the x, y mask coordinate system.

The above-described methods for determining the position of a non-orthogonal structural element on a substrate are performed by software operating in the measuring machine.

Of course, this methodology could also be implemented via hardware or some combination of software and hardware without departing from the scope of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a position P of a structural element on a substrate, in which the substrate is mounted on a measuring stage that is displaceable in an interferometrically measurable fashion in a measuring plane relative to a reference point, the structural element being imaged on a detector array by an imaging system that has its optical axis arranged perpendicular to the measuring plane, with the pixels of said detector array being arranged in rows and columns parallel to the axes of an x/y coordinate system associated with the substrate, the position P being defined by the distance of one edge of the structural element from the reference point, and the position $P_{IPC}$ of the edge on the detector array being determined by evaluation of an intensity profile of the edge image, that is derived from pixels located in a measuring window, and which is perpendicular to the edge direction, wherein a rectangular measuring window is produced having a boundary line aligned in parallel to the edge direction, the direction of another boundary line of the rectangular measuring window, that is perpendicular to the edge direction, being determined in the coordinate system of the detector array by its angle of rotation θ, further wherein a virtual pixel array is formed having fields arranged in rows and columns parallel to the boundary lines of the measuring window when the boundary lines of the measuring window lie non-orthogonally to the rows and columns of the detector array, and further wherein intensity values are assigned to the fields, said intensity values being determined by weighted evaluation of the intensities of those pixels of the detector array which are covered by a field, and further wherein the position $P_{IPC}$ of the edge is determined from its distance from the reference point based on the intensity values associated with the fields, and wherein the position P of the edge in the x,y coordinate system of the substrate is given as a function of the rotational angle Θ, the position $P_{IPC}$, and the x,y position of the reference point in the x,y coordinate system of the substrate by:

$P=P_{IPC}+L$, with $L=x \cdot \cos θ + y \cdot \sin θ$.

2. The method according to claim 1, wherein the measuring window is divided parallel to the edge direction and perpendicularly to the edge direction for automatic alignment of at least one boundary line of the measuring window, measuring information defining the edge position being determined in each divided measuring window, and the measuring window being rotated until optimum correlation of the measuring information of the divided measuring windows is achieved.

3. The method according to claim 1, wherein the fields have a size adapted to that of the pixels.

4. The method according to claim 3, wherein the adaptation of the size takes place as a function of the rotational angle Θ.

5. A method for determining a position of a structural element on a substrate, which structural element is non-orthogonal relative to axes of a coordinate system of the substrate, the method comprising the acts of:

aligning the substrate on a measuring stage movable in a measuring plane relative to a reference point to provide measuring stage coordinates;

imaging the structural element on a detector array of a CCD camera which defines the reference point;

determining an edge position of the structural element relative to the reference point using a measuring window rotated about an angle θ with respect to the coordinate system;

determining a reference point position of the reference point relative to an origin of the substrate coordinate system from the angle and the measuring stage coordinates; and summing the edge position and reference point position to provide the position of the structural element.

6. The method according to claim 5, wherein the act of determining the edge position comprises the acts of:

calculating an intensity profile from the imaged structural element for the rotated measuring window; and detecting the edge position from the calculated intensity profile.

7. The method according to claim 6, when the act of calculating the intensity profile for the rotated measuring window comprises the acts of:

forming a virtual pixel array for the rotated measuring window having a plurality of fields arranged in rows and columns, each of said fields being assigned an intensity value based on a weighted evaluation of all pixels in the detector array which correspond to the particular field; and averaging the assigned intensity values for each row or column of fields to provide the intensity profile.

8. An image intensity profile generating method, comprising the acts of:

imaging a structural element having a profile to be detected which is arranged non-orthogonally to an array of pixels of an image detector;

generating a measuring window orthogonal to the profile of the structural element to be detected, the measuring window having fields arranged in rows and columns;

assigning a pixel intensity value to each field based on a weighted interpolation of the pixels in the array which correspond to the field of the measuring window; and generating the image intensity profile of the structural element from either a row or column of fields having assigned intensity values extending across the profile of the structural element.

9. The method according to claim 8, wherein the act of generating the image intensity profile comprises the acts of:

averaging the assigned intensity values for each row or column of those fields which are arranged perpendicular to the profile of the structural element; and using the averaged intensity values for each row or column of fields to generate the image intensity profile.

10. A software product for determining a position of a structural element on a substrate, which structural element is non-orthogonal relative to axes of a coordinate system of the substrate, comprising:

a computer readable medium having stored thereon program code segments that:

align the substrate on a measuring stage, which is movable in a measuring plane relative to a reference point, to provide measuring stage coordinates;

image the structural element on a detector array of a CCD camera which defines the reference point;

calculate an edge position of the structural element relative to the reference point using a measuring window rotated about an angle θ with respect to the coordinate system;

calculate a reference point position of the reference point relative to an origin of the substrate coordinate system from the angle and the measuring stage coordinates; and sum the edge position and reference point position to provide the position of the structural element.

11. A system, comprising:

a semiconductor metrology machine, including a measuring stage, an imaging system and an image processor, said image processor operating in accordance with a software product for determining a position of a structural element on a substrate arrangeable in the semiconductor metrology system; and wherein said software product comprises:

a computer readable medium having stored thereon program code segments that:

align the substrate on a measuring stage, which is movable in a measuring plane relative to a reference point, to provide measuring stage coordinates;

image the structural element on a detector array of a CCD camera which defines the reference point;

calculate an edge position of the structural element relative to the reference point using a measuring window rotated about an angle $\theta$ with respect to the coordinate system;

calculate a reference point position of the reference point relative to an origin of the substrate coordinate system from the angle and the measuring stage coordinates; and sum the edge position and reference point position to provide the position of the structural element.

\* \* \* \* \*